(12) United States Patent
Iida

(10) Patent No.: US 11,106,771 B2
(45) Date of Patent: Aug. 31, 2021

(54) PASSWORD AUTHENTICATION DEVICE, RECORDING MEDIUM, AND PASSWORD AUTHENTICATION METHOD

(71) Applicant: Kyocera Document Solutions Inc., Osaka (JP)

(72) Inventor: Daichi Iida, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 316 days.

(21) Appl. No.: 16/392,542

(22) Filed: Apr. 23, 2019

(65) Prior Publication Data
US 2019/0325118 A1    Oct. 24, 2019

(30) Foreign Application Priority Data

Apr. 24, 2018 (JP) .............................. JP2018-083060

(51) Int. Cl.
*G06F 21/31* (2013.01)
(52) U.S. Cl.
CPC .................................. *G06F 21/316* (2013.01)
(58) Field of Classification Search
CPC .................................................... G06F 21/316
USPC .......................................................... 726/19
See application file for complete search history.

(56) References Cited

U.S. PATENT DOCUMENTS

| | | | | |
|---|---|---|---|---|
| 7,831,127 B2 * | 11/2010 | Wilkinson | ............. | H04N 21/84 370/406 |
| 8,924,739 B2 * | 12/2014 | Horn | ....................... | G06F 21/78 713/189 |
| 9,641,322 B2 * | 5/2017 | Ducharme | ....... | H04N 21/64715 |
| 2004/0257591 A1 * | 12/2004 | Engelman | .......... | G06K 15/1848 358/1.1 |
| 2007/0101120 A1 * | 5/2007 | Patel | ................... | H04W 12/033 713/151 |

(Continued)

FOREIGN PATENT DOCUMENTS

JP    2005-165451 A    6/2005

OTHER PUBLICATIONS

Pavaday et al., "A comparative study of secret code variants in terms of keystroke dynamics", doi: 10.1109/CRISIS.2008.4757473, 2008, pp. 133-140. (Year: 2008).*

*Primary Examiner* — Peter C Shaw
(74) *Attorney, Agent, or Firm* — James Judge

(57) ABSTRACT

A password authentication device includes a period information storage unit, an acquirer, an authentication unit, and an updating unit. The acquirer acquires the period information when the user inputs a password. The authentication unit authenticates the user when a difference between the reference value stored in the period information storage unit and the period information acquired by the acquirer is equal to or less than a specified value. The updating unit updates the reference value of the period information stored in the period information storage unit based on the period information acquired by the acquirer. The password input period indicates a period from when the user starts inputting the password until the user completes the input. The depression period proportion indicates a proportion that a depression period occupies the password input period. The period-between-characters proportion indicates a proportion that a period-between-characters occupies the password input period.

7 Claims, 8 Drawing Sheets

(56) References Cited

U.S. PATENT DOCUMENTS

2013/0064283 A1\* 3/2013 Sun ................. H04N 21/23439
                                              375/240.01
2016/0134549 A1\* 5/2016 Abel ................... H04L 47/2441
                                              370/389
2016/0315762 A1\* 10/2016 Moon ..................... H04L 9/065

\* cited by examiner

PASSWORD AUTHENTICATION DEVICE, RECORDING MEDIUM, AND PASSWORD AUTHENTICATION METHOD

INCORPORATION BY REFERENCE

This application is based upon, and claims the benefit of priority from, corresponding Japanese Patent Application No. 2018-083060 filed in the Japan Patent Office on Apr. 24, 2018, the entire contents of which are incorporated herein by reference.

BACKGROUND

Unless otherwise indicated herein, the description in this section is not prior art to the claims in this application and is not admitted to be prior art by inclusion in this section.

To prevent a person other than a user oneself from accessing a system using a password, many studies have been conducted. For example, a typical key registration device registers information indicative of whether a key is pressed long or not, in addition to content of a key input. The key registration device uses the information indicative of whether each key is pressed long or not for authentication, in addition to the content of the key input.

SUMMARY

A password authentication device according to one aspect of the disclosure includes a period information storage unit, an acquirer, an authentication unit, and an updating unit. The period information storage unit stores a reference value of period information for each user. The acquirer acquires the period information when the user inputs a password. The authentication unit authenticates the user when a difference between the reference value stored in the period information storage unit and the period information acquired by the acquirer is equal to or less than a specified value. The updating unit updates the reference value of the period information stored in the period information storage unit based on the period information acquired by the acquirer. The period information includes at least one of a password input period, a depression period proportion, and a period-between-characters proportion. The password input period indicates a period from when the user starts inputting the password until the user completes the input. The depression period proportion indicates a proportion that a depression period occupies the password input period. The depression period indicates a period from a time point of starting inputting each character constituting the password until a time point of completing the input. The period-between-characters proportion indicates a proportion that a period-between-characters occupies the password input period. The period-between-characters indicates a period from a time point of completing inputting a specific character constituting the password until a time point of starting inputting a character subsequent to the specific character.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
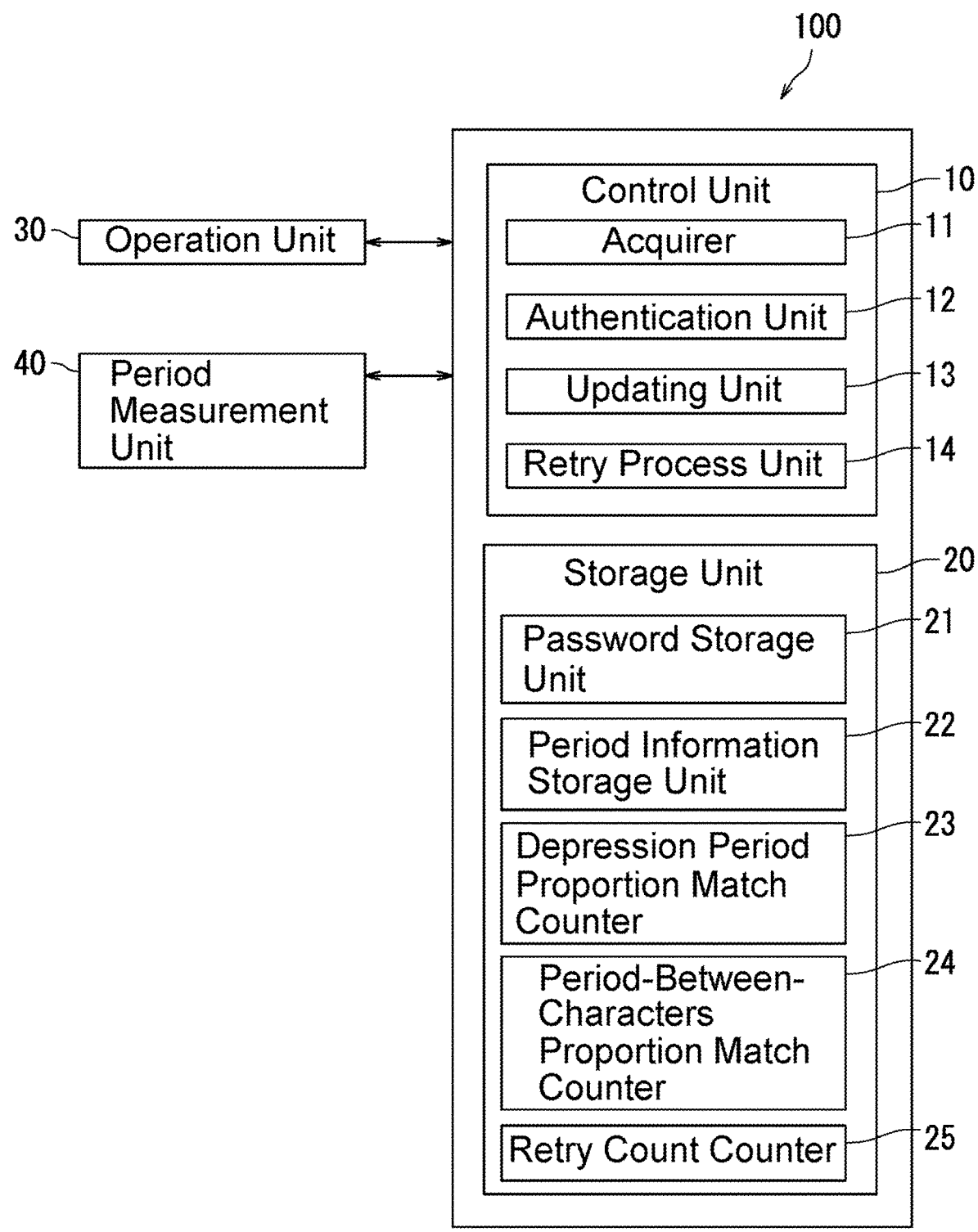
FIG. 1 illustrates a configuration of a password authentication device according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to the drawings (FIG. 1 to FIG. 8). In the drawings, identical reference numerals are used to the identical or corresponding parts, and their explanations are not repeated.

First, the following describes a configuration of a password authentication device 100 according to the embodiment with reference to FIG. 1. FIG. 1 illustrates the configuration of the password authentication device 100. As illustrated in FIG. 1, the password authentication device 100 is, for example, a color multi-functional peripheral.

As illustrated in FIG. 1, the password authentication device 100 includes a control unit 10, a storage unit 20, an operation unit 30, and a period measurement unit 40. Although not illustrated in FIG. 1, the password authentication device 100 includes a power supply, a communication board, a scanning unit, an image forming unit, and similar unit similarly to an ordinary color multi-functional peripheral.

The control unit 10 includes a processor and a control storage unit. The processor in the control unit 10 executes control programs stored in the control storage unit to execute processes such as a value calculation, information processing, and apparatus control. The processor in the control unit 10 is, for example, a Central Processing Unit (CPU) or a Micro Processing Unit (MPU).

The control unit 10 includes an acquirer 11, an authentication unit 12, an updating unit 13, and a retry process unit 14. Specifically, the processor in the control unit 10 executes the control programs to function as the acquirer 11, the authentication unit 12, the updating unit 13, and the retry process unit 14.

When a user inputs a password, the acquirer 11 acquires period information when the user inputs characters of the password using the period measurement unit 40, together with content (character string) of the password.

The period information indicates information on the period taken for the user to input the characters constituting the password and is a password input period, a depression period proportion, and a period-between-characters proportion.

The password input period indicates a period from a start of the input of the password until its completion.

The depression period proportion indicates a proportion that the depression period occupies the password input period. The depression period indicates a period from a time point of starting inputting the respective characters constituting the password until a time point of completing the input. Therefore, the depression period proportion is acquired by the number of characters (the number of digits) constituting the password.

The period-between-characters proportion indicates a proportion that the period-between-characters occupies the password input period. The period-between-characters indicates a period from a time point of completing an input of a specific character constituting the password until a time point of starting inputting a character subsequent to the specific character. Therefore, the period-between-characters proportion is acquired by the number of digits of the password.

The authentication unit 12 authenticates the user based on the character string of the password and the period information acquired by the acquirer 11. First, the authentication unit 12 confirms whether the character string of the password input by the user is identical to the character string of the password stored in the storage unit 20 or not. When the character string of the password input by the user is identical to the character string of the password stored in the storage unit 20, the operation advances to the authentication with the period information. In contrast, when the character string of the password input by the user is different from the character string of the password stored in the storage unit 20, the authentication unit 12 does not authenticate that the user is valid.

Next, the authentication unit 12 compares a reference value of the period information stored in the storage unit 20 with the period information acquired by the acquirer 11 and examines whether a difference between both is equal to or less than a preliminarily defined specified value or not. The specified value is, for example, 10%. With equal to or less than the specified value, the authentication unit 12 authenticates that the user is valid. In contrast, the authentication unit 12 does not authenticate that the user is valid in excess of the specified value.

The updating unit 13 updates the reference value of the period information stored in the storage unit 20 based on the period information acquired by the acquirer 11. The reference value is updated by, for example, calculating an arithmetic mean value of the reference value and the period information acquired by the acquirer 11 and overwrites the reference value by the calculated arithmetic mean value.

When the user is not authenticated, the retry process unit 14 executes a retry process that accepts re-authentication of the user. The retry process unit 14 changes content of the retry process according to a retry count of the user.

For example, the input is not accepted for ten seconds at the retry count of the first time. The input is not accepted for 30 seconds at the retry count of the second time. The input is not accepted for one minute at the retry count of the third time. The input is not accepted for the retry count×30 seconds at the retry count of the fourth time or more. When the retry count exceeds the preset limited count, the user who has repeated the retry process is not authenticated as the valid user and therefore cannot use the password authentication device 100.

Although not illustrated in FIG. 1, the control storage unit in the control unit 10 stores programs to control the power supply, the communication board, the operation unit 30, the period measurement unit 40, and similar device similarly to the storage unit provided with the ordinary color multifunctional peripheral.

The storage unit 20 includes a storage region functioning as a password storage unit 21, a period information storage unit 22, a depression period proportion match counter 23, a period-between-characters proportion match counter 24, and a retry count counter 25.

The password storage unit 21 stores a set of a user ID and the character string of the password.

The period information storage unit 22 stores the reference value of the period information of each user (user ID) per retry count. Therefore, even when the user is identical, the reference value when the retry is executed once and the reference value when the retry is executed three times are different.

The depression period proportion match counter 23 is a counter that increases a value when a difference between the reference value of the period information and the depression period proportion acquired by the acquirer 11 is equal to or less than a specified value. The depression period proportion match counter 23 is provided for each user.

The period-between-characters proportion match counter 24 is a counter that increases a value when a difference between the reference value of the period information and the period-between-characters proportion acquired by the acquirer 11 is equal to or less than a specified value. The period-between-characters proportion match counter 24 is provided for each user.

The retry count counter 25 is a counter that increases a value at the execution of the retry process. The retry count counter 25 is provided for each user.

The storage unit 20 stores setting values of the power supply, the communication board, the scanning unit, the image forming unit, and similar device similarly to the storage unit provided with the ordinary color multi-functional peripheral. The storage unit 20 includes a storage region temporarily available for calculation and comparison of values.

The operation unit 30 includes a display and a touch sensor. The touch sensor is located on a surface of the display used to operate the password authentication device 100.

The period measurement unit 40 includes a time measuring function such as a timepiece. The period measurement unit 40 controls the password authentication device 100 and measures period data constituting the period information.

Next, the following describes an operation until the authentication process by the password authentication device 100 is completed with reference to FIG. 2 to FIG. 8.

Figure 2:
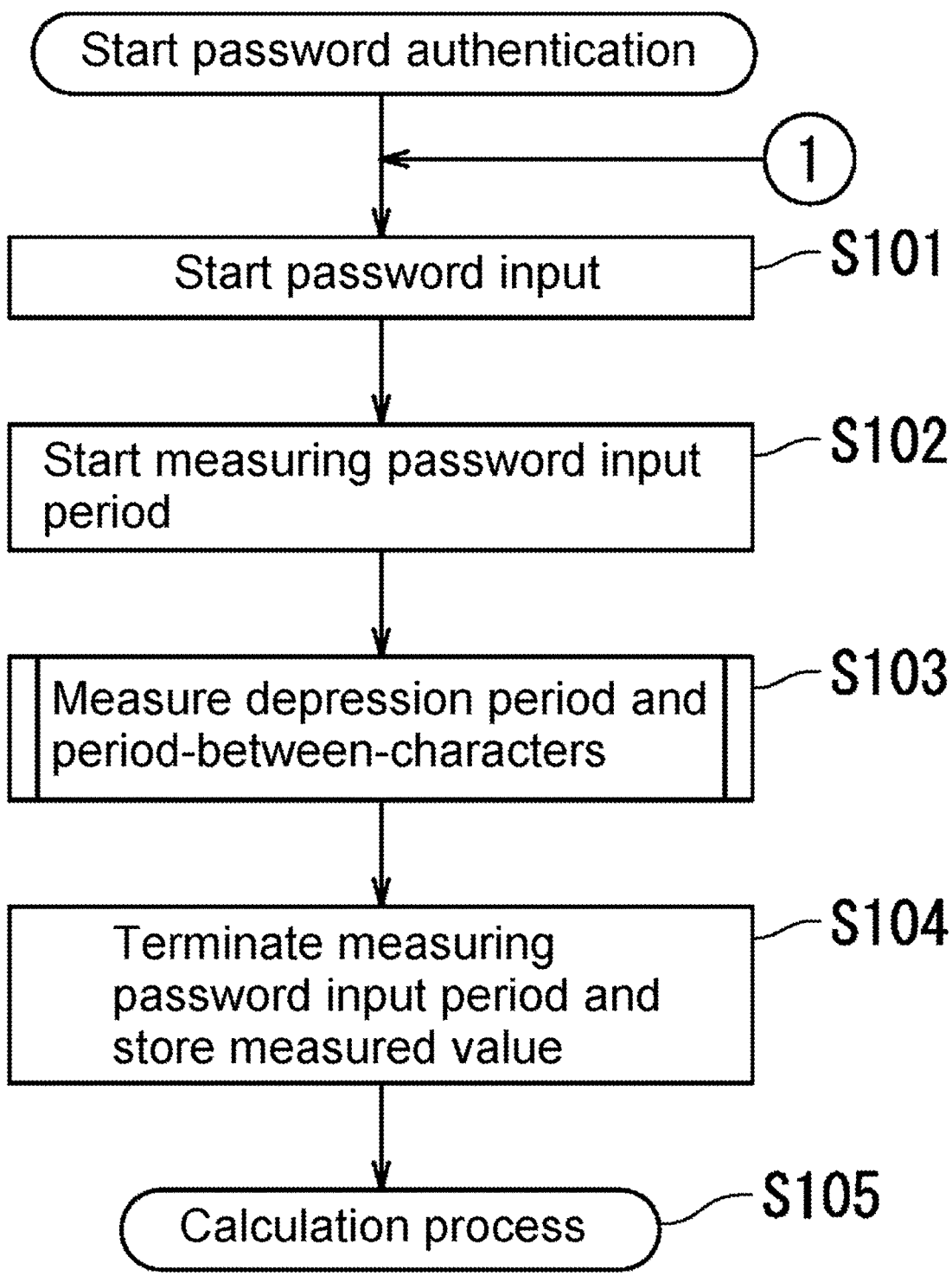
FIG. 2 illustrates an outline of an operation of an acquisition process according to the one embodiment.
Figure 3:
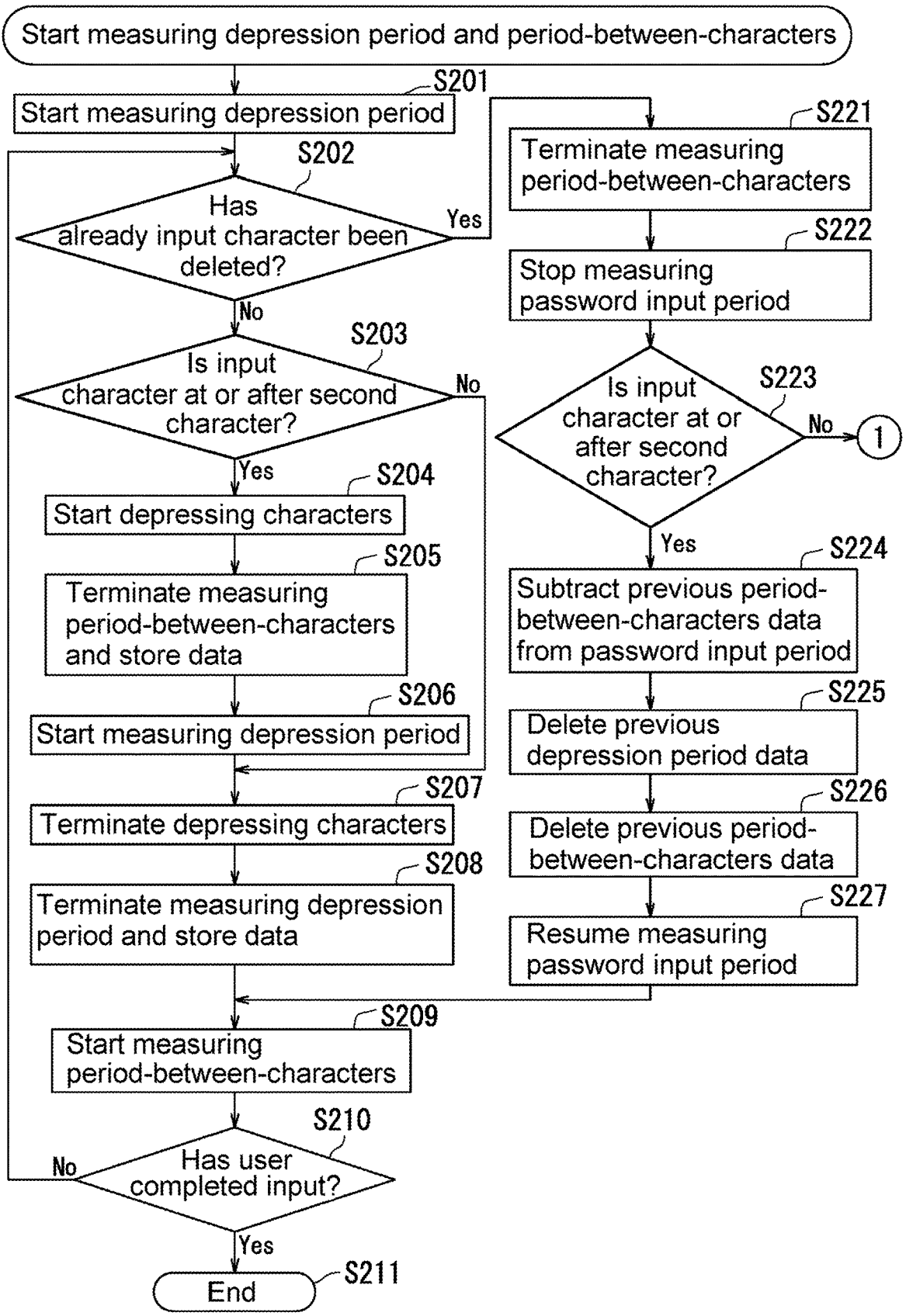
FIG. 3 illustrates a subroutine to acquire a depression period and a period-between-characters according to the one embodiment.

FIG. 2 and FIG. 3 illustrate an operation of an acquisition process. FIG. 2 illustrates an outline of the operation of the acquisition process. The acquisition process is a process that the password authentication device 100 acquires the password input period, the depression period, and the period-between-characters.

At Step S101, when the user starts inputting the password through the operation unit 30, the acquirer 11 senses the start of the input. The operation advances to Step S102.

At Step S102, the acquirer 11 uses the period measurement unit 40 to start measuring the password input period. The operation advances to Step S103.

At Step S103, the acquirer 11 acquires the depression period and the period-between-characters. The acquisitions of the depression period and the period-between-characters will be described later with reference to FIG. 3. The operation advances to Step S104.

At Step S104, the acquirer 11 terminates measuring the password input period. The operation advances to Step S105.

FIG. 3 illustrates a subroutine of acquiring the depression period and the period-between-characters.

At Step S201, the acquirer 11 starts measuring an input period of the first character of the password using the period measurement unit 40. The operation advances to Step S202.

At Step S202, the acquirer 11 determines whether the user has deleted a character mistakenly input or not. When the acquirer 11 determines that the character has not been deleted (NO at Step S202), the operation advances to Step S203. In contrast, when the acquirer 11 determines that the character has been deleted (YES at Step S221), the operation advances to Step S221.

At Step S203, the acquirer 11 determines whether the input character is at or after the second character or not. When the acquirer 11 determines that the character is at or after the second character (YES at Step S203), the operation advances to Step S204. In contrast, when the acquirer 11 determines that the character is not at or after the second character (is the first character) (NO at Step S203), the operation advances to Step S207.

At Step S204, to input characters at and after the second character, the user starts depressing keys. The operation advances to Step S205.

At Step S205, the acquirer 11 terminates measuring the period-between-characters and causes the storage unit 20 to store the measured value. Accordingly, the period-between-characters from the time point of completing the input of the character immediately before the character at or after the second character until the time point of starting inputting the character at or after the second character is stored. The operation advances to Step S206.

At Step S206, the acquirer 11 starts measuring the depression period of the characters at or after the second character. The operation advances to Step S207.

At Step S207, the user releases the finger from the depressed key, thus terminating depressing the characters. The operation advances to Step S208.

At Step S208, the acquirer 11 terminates measuring the depression period of the depressed key and causes the storage unit 20 to store the measured value. The operation advances to Step S209.

At Step S209, the acquirer 11 starts measuring the period-between-characters. The operation advances to Step S210.

At Step S210, the acquirer 11 determines whether the user has completed the input or not. When the acquirer 11 determines that the input is completed (YES at Step S210), the operation advances to Step S211. In contrast, when the acquirer 11 determines that the input is not completed (NO at Step S210), the operation advances to Step S202 and the acquirer 11 repeats Step S202 to Step S210 until the user completes the input.

At Step S221, the acquirer 11 terminates measuring the period-between-characters. This is because since the input first character has been deleted, this eliminates the need for measuring the period-between-characters. The operation advances to Step S222.

At Step S222, the acquirer 11 stops measuring the password input period. This is because since the first character of the password has been deleted, the starting time point of the password input period has disappeared. The operation advances to Step S223.

At Step S223, the acquirer 11 determines whether the input character is at or after the second character or not. When the acquirer 11 determines that the character is at or after the second character (YES at Step S223), the operation advances to Step S224. In contrast, when the acquirer 11 determines that the character is not at or after the second character (is the first character) (NO at Step S223), this means that the first character of the password is incorrect; therefore, the operation returns to Step S101 to input the password from the start.

At Step S224, the acquirer 11 subtracts the previous period-between-characters from the password input period. This is to reduce an influence of the period taken for the input and the correction of the incorrect character. The operation advances to Step S225.

At Step S225, the acquirer 11 deletes the previous depression period. The reason for executing this operation is identical to that of Step S224. The operation advances to Step S226.

At Step S226, the acquirer 11 deletes the previous period-between-characters. The reason for executing this operation is identical to that of Step S224. The operation advances to Step S227.

At Step S227, the acquirer 11 resumes measuring the password input period. This is because since the influence of the period taken for the input and the correction of the incorrect character is eliminated, the acquisition of the period information is resumed. The operation advances to Step S209.

Figure 4:
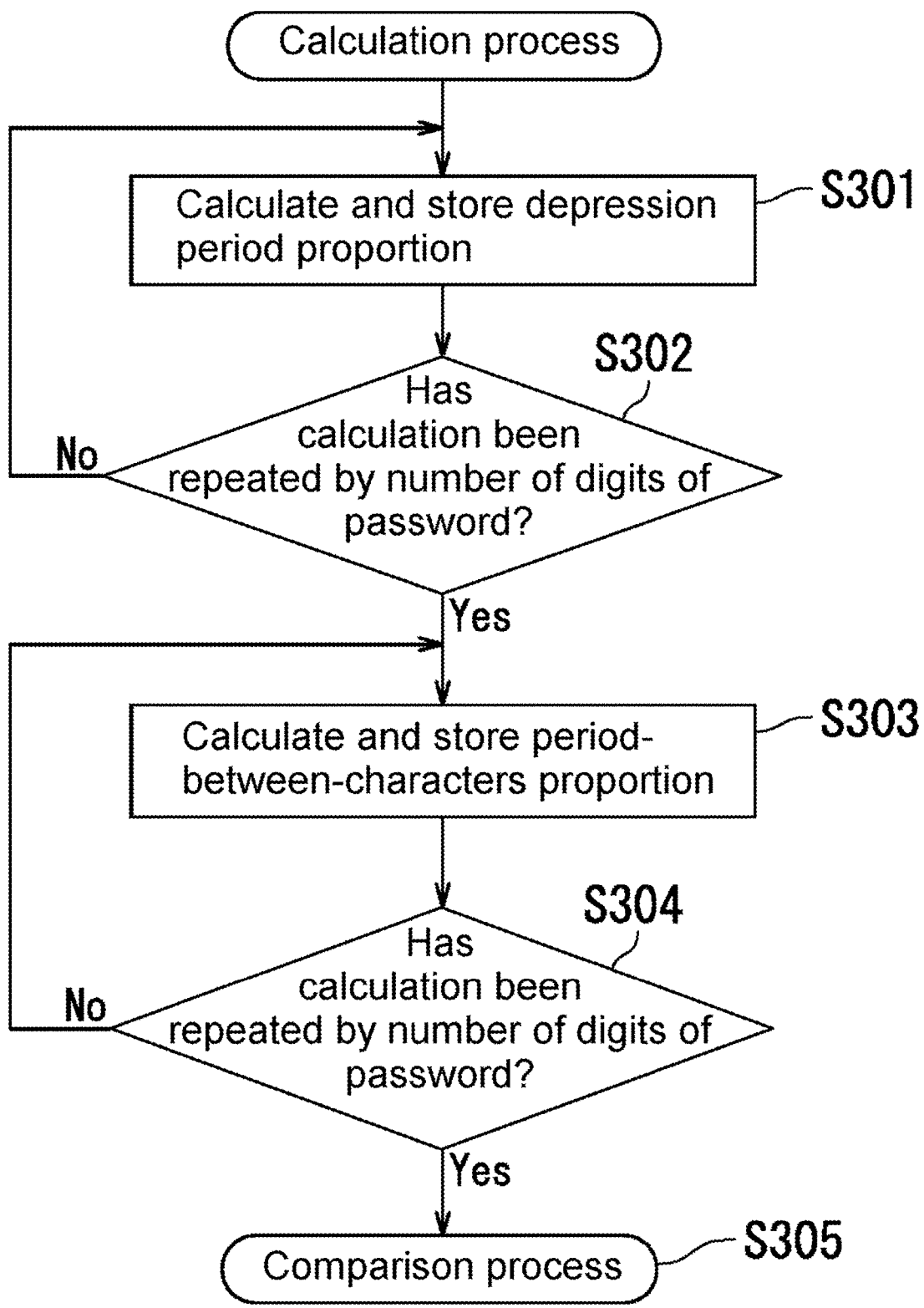
FIG. 4 illustrates an operation of a calculation process according to the one embodiment.

FIG. 4 illustrates an operation of a calculation process. The calculation process is a process that the password authentication device 100 calculates the depression period proportion and the period-between-characters proportion from the acquired password input period, depression period, and period-between-characters to acquire the period information.

At Step S301, the acquirer 11 divides the depression period of the specific character in the password by the password input period to calculate the depression period proportion. The acquirer 11 causes the storage unit 20 to store the calculated depression period proportion.

At Step S302, the acquirer 11 determines whether the depression period proportion has been repeatedly calculated by the number of digits of the password or not. When the acquirer 11 determines that the calculation has been repeated by the number of digits of the password (YES at Step S302), the operation advances to Step S303. In contrast, when the acquirer 11 determines that the calculation has not been repeated by number of digits of the password (NO at Step S302), Step S301 and Step S302 are repeated until the acquirer 11 determines that the calculation is repeated by the number of digits of the password.

At Step S303, the acquirer 11 divides the specific period-between-characters by the password input period to calculate the period-between-characters proportion. The acquirer 11 causes the storage unit 20 to store the calculated period-between-characters. The operation advances to Step S304.

At Step S304, the acquirer 11 determines whether the depression period proportion has been repeatedly calculated by the number of digits of the password or not. When the acquirer 11 determines that the calculation has been repeated by the number of digits of the password (YES at Step S304), the operation advances to Step S305. In contrast, when the acquirer 11 determines that the calculation has not been repeated by the number of digits of the password (NO at Step S304), Step S303 and Step S304 are repeated until the acquirer 11 determines that the calculation is repeated by the number of digits of the password.

Figure 5:
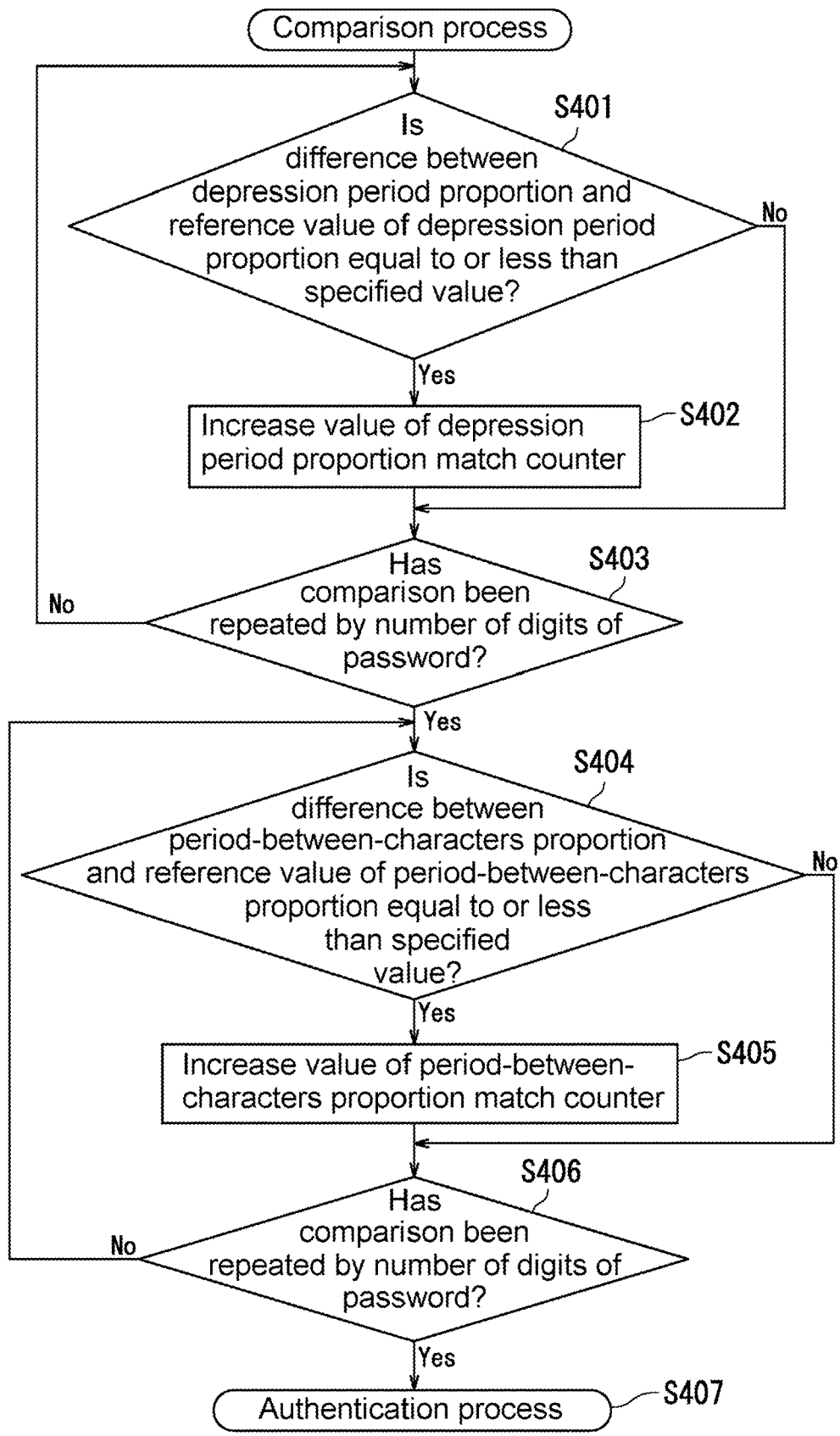
FIG. 5 illustrates an operation of a comparison process according to the one embodiment.

FIG. 5 illustrates an operation of a comparison process. The comparison process is a process that the password authentication device 100 compares the period information acquired from the user with the reference value of the period information stored in the storage unit 20 for each character constituting the password.

At Step S401, the authentication unit 12 reads the depression period proportion and the reference value of the depression period proportion from the storage unit 20. The authentication unit 12 obtains a difference between the read period proportion and the reference value of the read depression period proportion. When the authentication unit 12 determines that the obtained difference is equal to or less than a specified value (YES at Step S401), the operation advances to Step S402. In contrast, when the authentication unit 12 determines that the obtained difference is not equal to or less than the specified value (NO at Step S401), the operation advances to Step S403.

At Step S402, the authentication unit 12 increases the value of the depression period proportion match counter 23.

At Step S403, the authentication unit 12 determines whether the depression period proportions have been repeatedly compared by the number of digits of the password or not. When the authentication unit 12 determines that the comparison has been repeated by the number of digits of the password (YES at Step S403), the operation advances to Step S404. In contrast, when the authentication unit 12 determines that the comparison has not been repeated by the number of digits of the password (NO at Step S403), Step S401 to Step S403 are repeated until the authentication unit 12 determines that the comparison is repeated by the number of digits of the password.

At Step S404, the authentication unit 12 reads the period-between-characters proportion and the reference value of the period-between-characters proportion from the storage unit 20. The authentication unit 12 obtains the difference between the read period-between-characters proportion and the read reference value of the period-between-characters proportion. When the authentication unit 12 determines that the obtained difference is equal to or less than the specified value (YES at Step S404), the operation advances to Step S405. In contrast, when the authentication unit 12 determines that the obtained difference is not equal to or less than the specified value (NO at Step S404), the operation advances to Step S406.

At Step S405, the authentication unit 12 increases the value of the period-between-characters proportion match counter 24.

At Step S406, the authentication unit 12 determines whether the period-between-characters proportions have been repeatedly compared by the number of digits of the password or not. When the authentication unit 12 determines that the comparison has been repeated by the number of digits of the password (YES at Step S406), the operation advances to Step S407. In contrast, when the authentication unit 12 determines that the comparison has not been repeated by the number of digits of the password (NO at Step S406), Step S404 to Step S406 are repeated until the authentication unit 12 determines that the comparison is repeated by the number of digits of the password.

Figure 6:
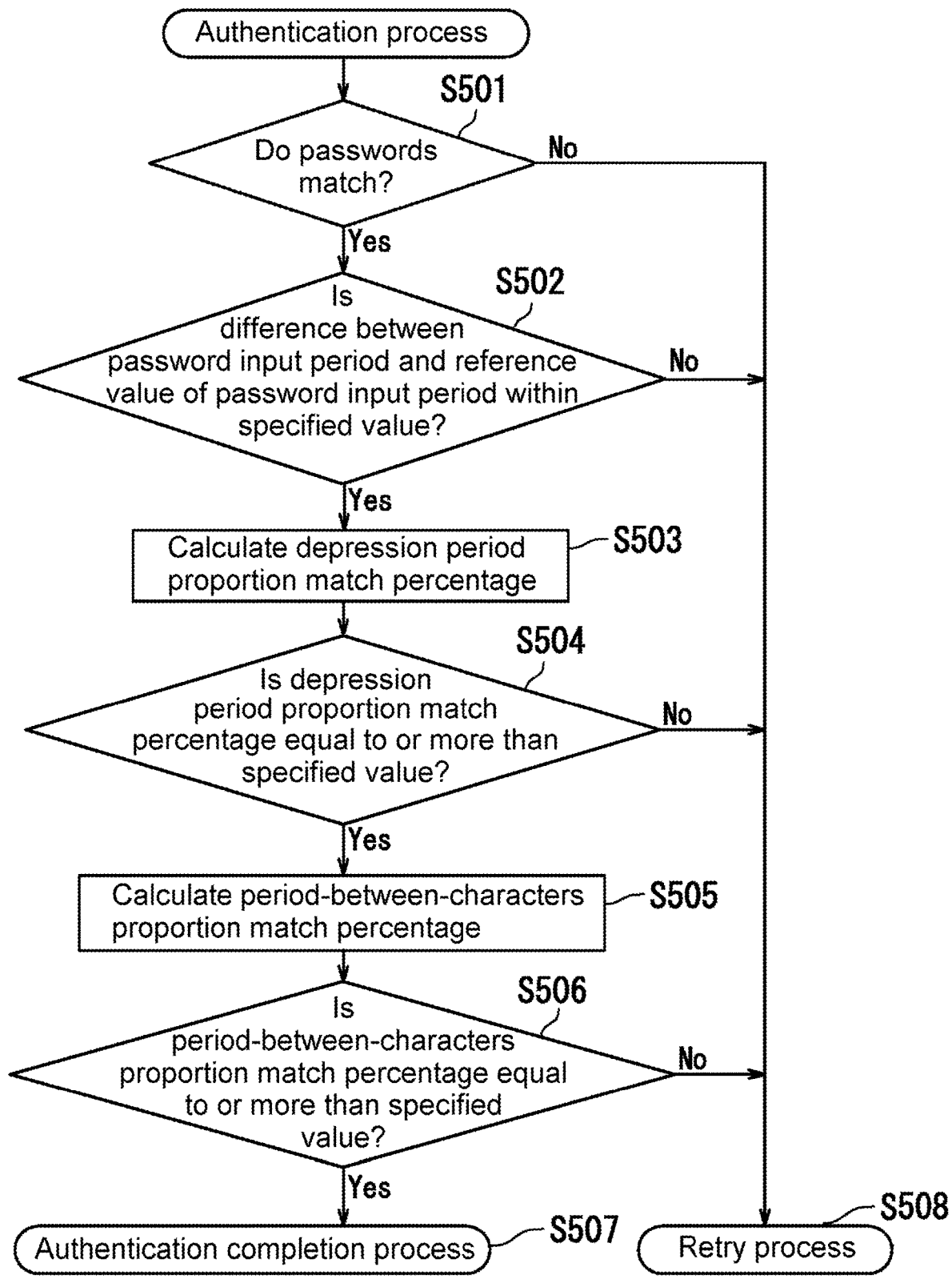
FIG. 6 illustrates an operation of an authentication process according to the one embodiment.

FIG. 6 illustrates an operation of an authentication process. The authentication process is a process that the password authentication device 100 authenticates the user based on the password input period, a depression period proportion match percentage, and a period-between-characters match percentage.

At Step S501, the authentication unit 12 determines whether the character string of the password input by the user matches the character string of the password stored in the storage unit 20 or not. When the authentication unit 12 determines that they match (YES at Step S501), the operation advances to Step S502. In contrast, when the authentication unit 12 determines that they do not match (NO at Step S501), the operation advances to Step S508.

At Step S502, the authentication unit 12 reads the password input period and the reference value of the password input period from the storage unit 20. The authentication unit 12 determines whether a difference between the read password input period and the read reference value of the password input period is within a specified value or not. When the authentication unit 12 determines that the difference is within the specified value (YES at Step S502), the operation advances to Step S503. In contrast, when the authentication unit 12 determines that the difference is not within the specified value (NO at Step S502), the operation advances to Step S508.

At Step S503, the authentication unit 12 calculates the depression period proportion match percentage. The depression period proportion match percentage is a value found by dividing the value of the depression period proportion match counter 23 by the number of characters of the password and then multiplying the calculated value by 100.

At Step S504, the authentication unit 12 determines whether the depression period proportion match percentage is equal to or more than a specified value or not. When the authentication unit 12 determines that the depression period proportion match percentage is equal to or more than the specified value (YES at Step S504), the operation advances to Step S505. In contrast, when the authentication unit 12 determines that the depression period proportion match percentage is not equal to or more than the specified value (NO at Step S504), the operation advances to Step S508.

At Step S505, the authentication unit 12 calculates the period-between-characters proportion match percentage. The period-between-characters proportion match percentage is a value found by dividing the value of the period-between-characters proportion match counter 24 by (the number of characters of the password—1) and then multiplying the calculated value by 100.

At Step S506, the authentication unit 12 determines whether the period-between-characters proportion match percentage is equal to or more than the specified value or not. When the authentication unit 12 determines that the period-between-characters proportion match percentage is equal to or more than the specified value (YES at Step S506), the operation advances to Step S507. In contrast, when the authentication unit 12 determines that the period-between-characters proportion match percentage is not equal to or more than the specified value not (NO at Step S506), the operation advances to Step S508.

Figure 7:
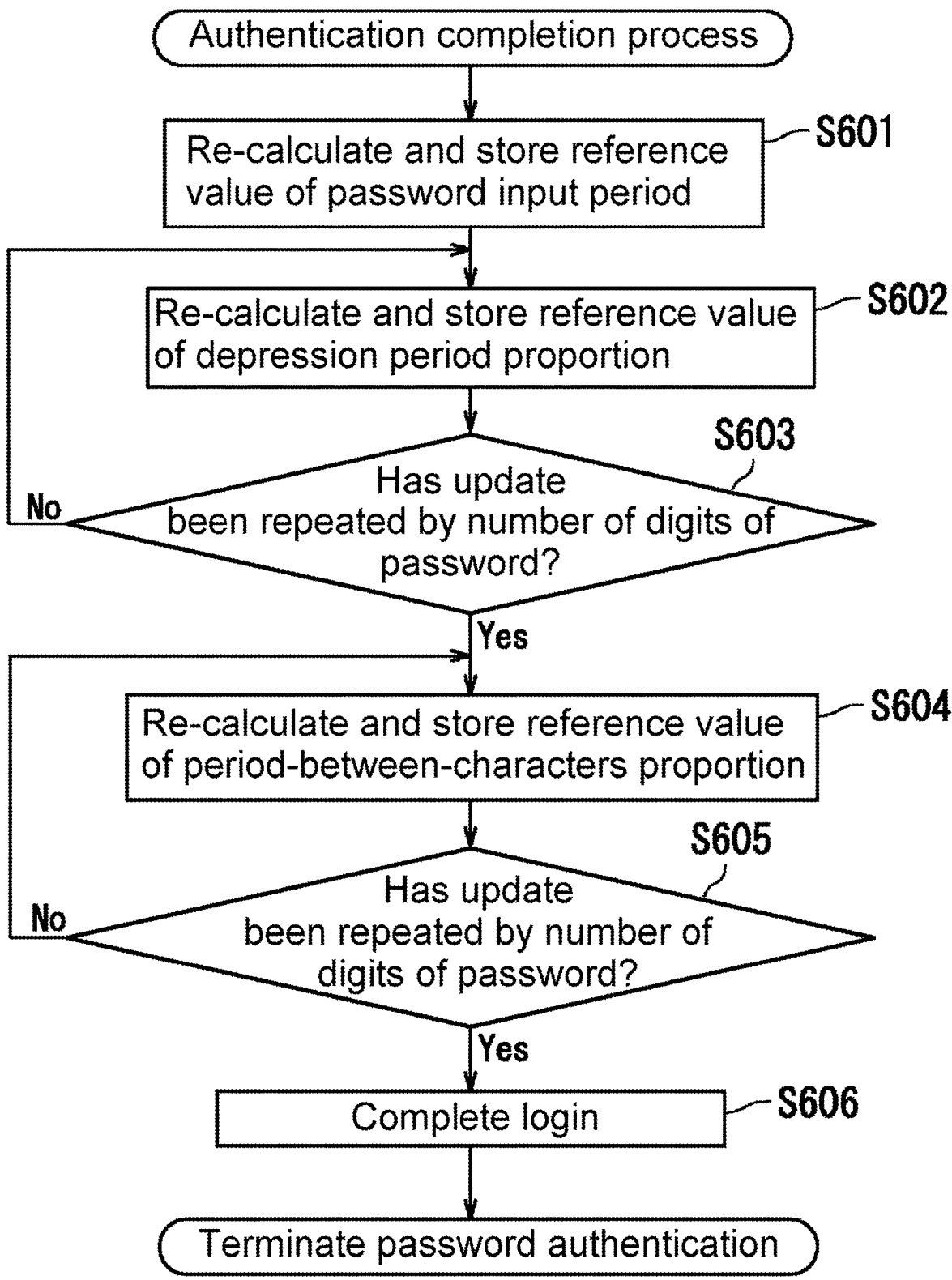
FIG. 7 illustrates an operation of an authentication completion process according to the one embodiment.

FIG. 7 illustrates an operation of an authentication completion process. The authentication completion process is a process that the password authentication device 100 updates the reference value of the period information stored in the storage unit 20 based on the acquired period information and then completes the authentication.

At Step S601, the updating unit 13 re-calculates the reference value of the password input period. Specifically, the updating unit 13 calculates an arithmetic mean value of the reference value of the password input period stored in the period information storage unit 22 and the password input period when the user inputs the password. The updating unit 13 saves the obtained arithmetic mean value in the period information storage unit 22 as the reference value of the password input period. The operation advances to Step S602.

At Step S602, the updating unit 13 re-calculates the reference value of the depression period proportion. Specifically, the updating unit 13 calculates an arithmetic mean value of the reference value of the depression period proportion of the specific character in the password stored in the period information storage unit 22 and the depression period proportion when the user inputs the password. The updating unit 13 saves the obtained arithmetic mean value in the period information storage unit 22 as a new reference value of the depression period proportion. The operation advances to Step S603.

At Step S603, the updating unit 13 determines whether the update of the depression period proportion has been repeated by the number of digits of the password or not. When the updating unit 13 determines that the update has been repeated by the number of digits of the password (YES at Step S603), the operation advances to Step S604. In contrast, when the updating unit 13 determines that the update has not been repeated by the number of digits of the password (NO at Step S603), Step S602 and Step S603 are repeated until the updating unit 13 determines that the update has been repeated by the number of digits of the password.

At Step S604, the updating unit 13 re-calculates the reference value of the period-between-characters proportion. Specifically, the updating unit 13 calculates an arithmetic mean value of the reference value of the period-between-characters proportion of the specific period-between-characters proportion in the password stored in the period information storage unit 22 and the period-between-characters proportion when the user inputs the password. The updating unit 13 saves the obtained arithmetic mean value in the period information storage unit 22 as a new reference value of the period-between-characters proportion. The operation advances to Step S605.

At Step S605, the updating unit 13 determines whether the update of the period-between-characters proportion has been repeated by the number of digits of the password or not. When the updating unit 13 determines that the update has been repeated by the number of digits of the password (YES at Step S605), the operation advances to Step S606. In contrast, when the updating unit 13 determines that the update has not been repeated by the number of digits of the password (NO at Step S605), Step S604 and Step S605 are repeated until the updating unit 13 determines that the update is repeated by the number of digits of the password.

At Step S606, a login process of the password authentication device 100 is completed and the password authentication device 100 becomes usable. Specifically, since the password authentication device 100 of this embodiment is the color multi-functional peripheral, printing, document reading, and a fax transmission can be executed.

Figure 8:
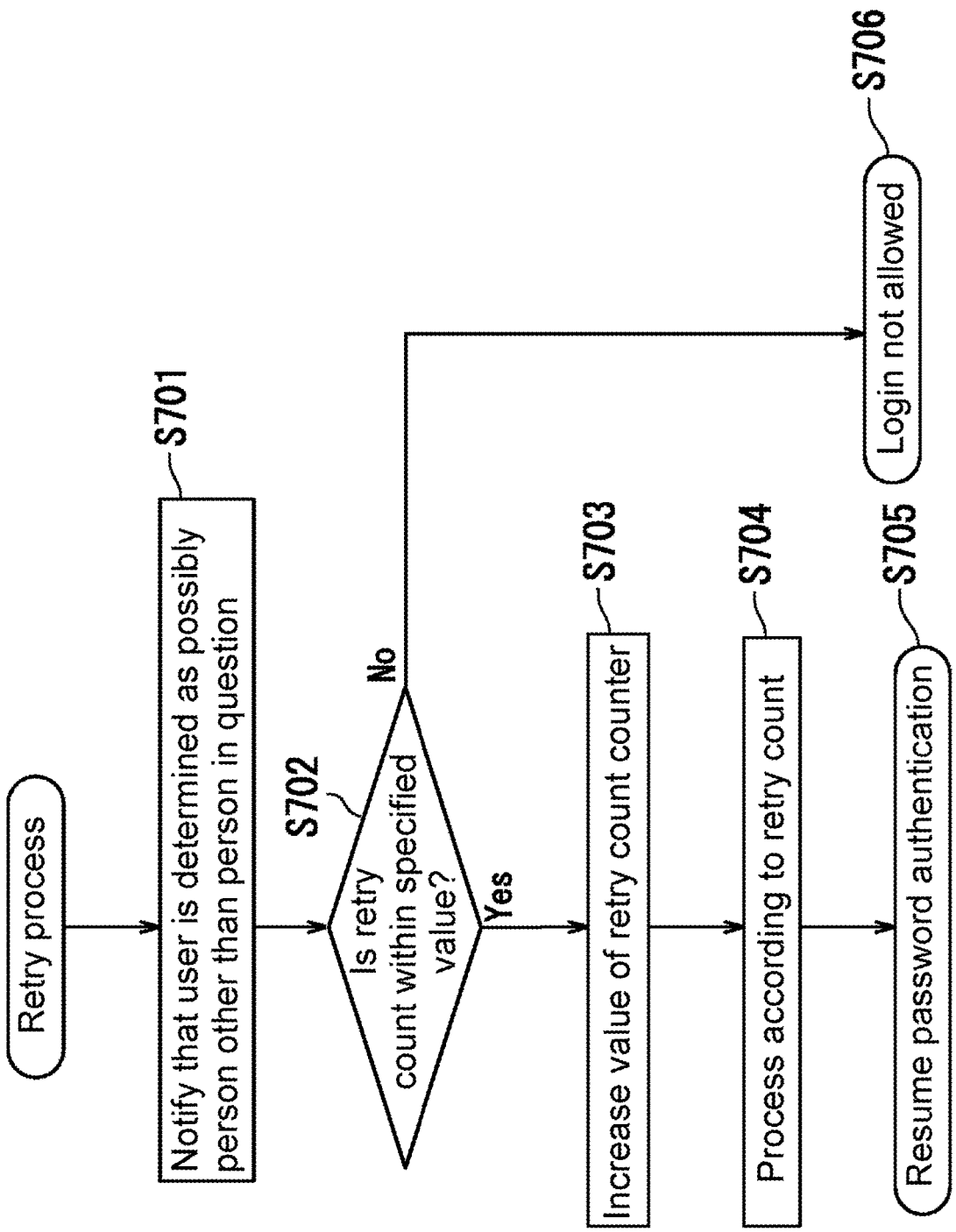
FIG. 8 illustrates an operation of a retry process according to the one embodiment.

FIG. 8 illustrates an operation of the retry process. The retry process is a process that accepts the re-authentication of the user when the password authentication device 100 does not authenticate the user.

At Step S701, the retry process unit 14 notifies the user that the user is determined as possibly a person other than the person in question. Specifically, the notification is displayed on the display of the operation unit 30. The operation advances to Step S702.

At Step S702, the retry process unit 14 determines whether the retry count is within a specified value or not. When the retry process unit 14 determines that the retry count is within the specified value (YES at Step S702), the operation advances to Step S703. In contrast, when the retry process unit 14 determines that the retry count is not within the specified value (NO at Step S702) the operation advances to Step S706.

At Step S703, the retry process unit 14 increases the value of the retry count counter 25. The operation advances to Step S704.

At Step S704, the retry process unit 14 executes the retry process according to the retry count. The retry process unit 14 changes content of the retry process according to the retry count of the user.

For example, the input is not accepted for ten seconds at the retry count of the first time. The input is not accepted for 30 seconds at the retry count of the second time. The input is not accepted for one minute at the retry count of the third time. The input is not accepted for the retry count×30 seconds at the retry count of the fourth time or more. When the retry count exceeds the preset limited count, the user who has repeated the retry process is not authenticated as the valid user and therefore cannot use the password authentication device 100. The operation advances to Step S705.

At Step S705, the retry process unit 14 resumes the authentication by the password authentication device 100. Specifically, the operation returns to Step S101.

At Step S706, the retry process unit 14 does not recognize the user as the valid user, and the authentication is terminated in a state where the user cannot login the password authentication device 100. Therefore, the user cannot use the password authentication device 100.

As described with reference to FIG. 1 to FIG. 8, in the embodiment of the disclosure, the period information including at least one of the password input period, the depression period proportion, and the period-between-characters proportion is acquired in addition to the character string of the password and the period information is used for the user authentication. Each time the user inputs the password, the reference value of the period information is updated. Therefore, even when the password leaks, the password authentication device 100 cannot be easily accessed.

The embodiment of the disclosure has been described above with reference to the drawings. Note that the disclosure is not limited to the above-described embodiment and can be embodied in various aspects within the scope not departing from the gist (for example, (1) to (3) described below). The drawings schematically illustrate respective components mainly for easy understanding, and the thickness, length, number, and similar factor of the illustrated respective components are different from the actual thickness, length, number, and similar factor for the convenience of preparing the drawings. The shapes, dimensions, and similar factors of the respective components described in the embodiment described above are merely examples and are not particularly limited, thus they are variously changeable within the scope not substantially departing from the configuration of the disclosure.

(1) As described with reference to FIG. 1 to FIG. 8, while the embodiment of the disclosure uses the color multi-functional peripheral as the password authentication device 100, the disclosure is not limited to this. The password authentication device 100 only needs to be a device that requires the authentication with the password. For example, the password authentication device 100 may be a monochrome multi-functional peripheral, a color printer, a server device, a personal computer (PC), and a smart phone.

(2) As described with reference to FIG. 1 to FIG. 8, while the embodiment of the disclosure uses all of the password input period, the depression period proportion, and the period-between-characters proportion for the authentication of the password authentication device 100, the disclosure is not limited to this. For example, two or one of the password input period, the depression period proportion, and the period-between-characters proportion may be used for the authentication.

(3) As described with reference to FIG. 1 to FIG. 8, while the embodiment of the disclosure executes the calculation in the order of the depression period proportion and the period-between-characters proportion and the comparison in the order of the depression period proportion match percentage and the period-between-characters proportion match percentage, the disclosure is not limited to this. These calculation and comparison may be executed in the opposite orders.

The disclosure is applicable to the field of the password authentication.

Exemplary Embodiment of the Disclosure

A password authentication device according the disclosure includes a period information storage unit, an acquirer, an authentication unit, and an updating unit. The period information storage unit stores a reference value of period information for each user. The acquirer acquires the period information when the user inputs a password. The authentication unit authenticates the user when a difference between the reference value stored in the period information storage unit and the period information acquired by the acquirer is equal to or less than a specified value. The updating unit updates the reference value of the period information stored in the period information storage unit based on the period information acquired by the acquirer. The period information includes at least one of a password input period, a depression period proportion, and a period-between-characters proportion. The password input period indicates a period from when the user starts inputting the password until the user completes the input. The depression period proportion indicates a proportion that a depression period occupies the password input period. The depression period indicates a period from a time point of starting inputting each character constituting the password until a time point of completing the input. The period-between-characters proportion indicates a proportion that a period-between-characters occupies the password input period. The period-between-characters indicates a period from a time point of completing inputting a specific character constituting the password until a time point of starting inputting a character subsequent to the specific character.

A password authentication program according to the disclosure is a program that causes a computer to execute a password authentication process. The password authentication process includes: storing a reference value of period information for each user; acquiring the period information when the user inputs a password; authenticating the user when a difference between the reference value of the period information and the period information acquired when the password is input is equal to or less than a specified value; and updating the reference value of the period information based on the period information acquired when the password is input. The period information includes at least one of a password input period, a depression period proportion, and a period-between-characters proportion. The password input period indicates a period from when the user starts inputting the password until the user completes the input. The depression period proportion indicates a proportion that a depression period occupies the password input period. The depression period indicates a period from a time point of starting inputting each character constituting the password until a time point of completing the input. The period-between-characters proportion indicates a proportion that a period-between-characters occupies the password input period. The period-between-characters indicates a period from a time point of completing inputting a specific character constituting the password until a time point of starting inputting a character subsequent to the specific character.

A password authentication method according to the disclosure includes: storing a reference value of period information for each user; acquiring the period information when the user inputs a password; authenticating the user when a difference between the reference value of the period information and the period information acquired when the password is input is equal to or less than a specified value; and updating the reference value of the period information based on the period information acquired when the password is input. The period information includes at least one of a password input period, a depression period proportion, and a period-between-characters proportion. The password input period indicates a period from when the user starts inputting the password until the user completes the input. The depression period proportion indicates a proportion that a depression period occupies the password input period. The depression period indicates a period from a time point of starting inputting each character constituting the password until a time point of completing the input. The period-between-characters proportion indicates a proportion that a period-between-characters occupies the password input period. The period-between-characters indicates a period from a time point of completing inputting a specific character constituting the password until a time point of starting inputting a character subsequent to the specific character.

Effects of the Disclosure

The password authentication device, the password authentication program, and the password authentication method of the disclosure authenticate the user with the password and the acquired period information and make it difficult to execute the access even when the information such as the password and a time interval at the input leaks.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A password authentication device comprising: a period information storage unit that stores a reference value of period information for each user; an acquirer that acquires the period information when the user inputs a password; an authentication unit that authenticates the user when a difference between the reference value stored in the period information storage unit and the period information acquired by the acquirer is equal to or less than a specified value; and an updating unit that updates the reference value of the period information stored in the period information storage unit based on the period information acquired by the acquirer, wherein the period information includes a password input period, a depression period proportion, and a period-between-characters proportion, the password input period indicates a period from when the user starts inputting the password until the user completes the input, the depression period proportion indicates a proportion that a depression period occupies the password input period, the depression period indicates a period from a time point of starting inputting each character constituting the password until a time point of completing the input, the period-between-characters proportion indicates a proportion that a period-between-characters occupies the password input period, and the period-between-characters indicates a period from a time point of completing inputting a specific character constituting the password until a time point of starting inputting a character subsequent to the specific character.

2. The password authentication device according to claim 1, wherein the updating unit calculates an arithmetic mean value of the reference value of the period information and the period information when the user inputs the password, and the updating unit overwrites a specified value of the period information by the arithmetic mean value to update the specified value of the period information.

3. The password authentication device according to claim 1, further comprising a retry process unit, wherein the retry process unit executes a retry process to accept re-authentication of the user when the user is not authenticated.

4. The password authentication device according to claim 3, wherein the period information storage unit stores different reference values according to counts of the retry process.

5. The password authentication device according to claim 3, wherein content of the retry process for the user is changed according to a count of the retry process.

6. A non-transitory computer-readable recording medium that stores a password authentication program, the password authentication program causing a computer to execute a password authentication process, wherein the password authentication process comprises: storing a reference value of period information for each user; acquiring the period information when the user inputs a password; authenticating the user when a difference between the reference value of the period information and the period information acquired when the password is input is equal to or less than a specified value; and updating the reference value of the period information based on the period information acquired when the password is input, the period information includes a password input period, a depression period proportion, and a period-between-characters proportion, the password input period indicates a period from when the user starts inputting the password until the user completes the input, the depression period proportion indicates a proportion that a depression period occupies the password input period, the depression period indicates a period from a time point of starting inputting each character constituting the password until a time point of completing the input, the period-between-characters proportion indicates a proportion that a period-between-characters occupies the password input period, and the period-between-characters indicates a period from a time point of completing inputting a specific character constituting the password until a time point of starting inputting a character subsequent to the specific character.

7. A password authentication method comprising: storing a reference value of period information for each user; acquiring the period information when the user inputs a password; authenticating the user when a difference between the reference value of the period information and the period information acquired when the password is input is equal to or less than a specified value; and updating the reference value of the period information based on the period information acquired when the password is input, wherein the period information includes a password input period, a depression period proportion, and a period-between-characters proportion, the password input period indicates a period from when the user starts inputting the password until the user completes the input, the depression period proportion indicates a proportion that a depression period occupies the password input period, the depression period indicates a period from a time point of starting inputting each character constituting the password until a time point of completing the input, the period-between-characters proportion indicates a proportion that a period-between-characters occupies the password input period, and the period-between-characters indicates a period from a time point of completing inputting a specific character constituting the password until a time point of starting inputting a character subsequent to the specific character.

* * * * *